United States Patent [19]
Manabe

[11] Patent Number: 5,884,106
[45] Date of Patent: Mar. 16, 1999

[54] ZOOM FINDER FOR A CAMERA

[75] Inventor: Mitsuo Manabe, Saitama, Japan

[73] Assignee: Fuji Photo Optical Co., Ltd., Saitama, Japan

[21] Appl. No.: 972,735

[22] Filed: Nov. 18, 1997

[30] Foreign Application Priority Data

Nov. 26, 1996 [JP] Japan ................................. 8-314963

[51] Int. Cl.⁶ ................................................ G03B 13/10
[52] U.S. Cl. ............................................ 396/84; 396/379
[58] Field of Search ............................ 396/84, 85, 373, 396/379

[56] References Cited

U.S. PATENT DOCUMENTS 5,036,346  7/1991  Hatamori et al. .......................... 396/84
5,337,109  8/1994  Ogawa .................................... 396/379

FOREIGN PATENT DOCUMENTS 6-250263  9/1994  Japan .
7-43779   2/1995  Japan .
7-14411   3/1995  Japan .
7-199284  8/1995  Japan .

*Primary Examiner*—Safet Metjahic
*Assistant Examiner*—J. K. Han
*Attorney, Agent, or Firm*—Leydig, Voit & Mayer

[57] ABSTRACT

In a finder, a movable lens is supported by a shaft and a guide plate respectively at both side edge portions thereof so as to keep a balance. The movable lens is moved accurately and smoothly. Also, the guide plate for supporting the side edge portion of the movable lens is separated from the frame. Accordingly, the movement of the movable lens can be smoothed when the machining accuracy of the guide plate is enhanced alone so as to support the movable lens at an accurate position.

8 Claims, 3 Drawing Sheets

ZOOM FINDER FOR A CAMERA

BACKGROUND OF THE INVENTION

1. Field of the Invention

The present invention relates to a finder and, in particular, to a finder of a camera equipped with a zooming function.

2. Related Background Art

A camera which can switch between wide-angle and telephoto photographing modes is typically equipped with a zoom finder which changes the magnification of its field of view in response to switching between these modes. FIG. 5 is a schematic view showing a configuration of such a conventional finder. This finder A is configured such that movable lenses E and F are disposed on an optical axis D between an objective lens B and an eyepiece C, and a coil spring G is disposed between the movable lenses E and F so as to urge them toward each other, whereby the movable lenses E and F are moved by a cam mechanism or the like. As the photographing mode is switched between wide angle and telephoto, the movable lenses E and F move appropriately, thus changing the range of field of view of the finder A in conformity to the photographing range.

In the above-mentioned finder A, it is important for the movable lenses E and F to accurately move along the optical axis D when switching from wide angle to telephoto or vice versa. For example, when the movable lenses E and F fluctuate, the object image viewed through the finder A shifts during switching between wide angle and telephoto. When a high-quality lens is used in this case, the fluctuation (hereinafter referred to as "image blur") of the object image or the like is enhanced as the object image becomes more vivid, whereby the intrinsic performances of the lens may not fully be exhibited.

As means against such fluctuation of the movable lenses E and F, it has been proposed to attach the coil spring G to the movable lenses E and F as being twisted. For example, the coil spring G is attached to the movable lenses E and F in a state where one end side of the coil spring G is fixed while the other end side is twisted several times, thus applying an urging force to the movable lenses E and F not only in a tensile direction in parallel with the optical axis but also in a direction orthogonal to the optical axis, whereby a part of the movable lenses E and F abuts a frame or the like so as to be prevented from fluctuating.

With this means in which the coil spring G is twisted, in order to make a camera, there is consequently needed a step of attaching the coil spring G to the movable lenses E and F while twisting it. Such a step is quite difficult and inevitably lowers the efficiency in manufacture. Also, a part of the movable lenses E and F is forcibly rubbed against the frame or the like every time they move, thus additionally requiring means against friction so as to enable them to be used for a long time.

SUMMARY OF THE INVENTION

In order to overcome the foregoing problems, it is an object of the present invention to provide a camera finder which can move a movable lens securely and smoothly, while allowing its efficiency in manufacture to improve.

The finder in accordance with the present invention comprises:

a frame;

a fixed lens attached to the frame;

a movable lens attached to the frame so as to be movable along an optical axis of the fixed lens;

a shaft disposed in the frame in parallel with the optical axis so as to penetrate through one side edge portion of the movable lens; and a guide plate, having a slit extending in parallel with the optical axis, for preventing the movable lens from fluctuating in a direction orthogonal to the optical axis, the other side edge portion of the movable lens slidably engaging with the slit.

In accordance with the present invention, since the movable lens is supported by the shaft and the guide plate at its right and left side edge portions so as to keep a balance, it can be moved accurately and smoothly. Also, since the guide plate for supporting the side edge portion of the movable lens is separated from the frame, the movement of the movable lens can be smoothed when the machining accuracy of the guide plate is enhanced alone so as to support the movable lens at an accurate position.

Also, in the present invention, the guide plate may be provided with an elongated hole disposed in the vicinity of an outer edge thereof along the outer edge, and the guide plate may be attached to the frame by pressing into the elongated hole a plurality of protrusions projecting from the frame. In this case, the guide plate can be attached to an accurate position securely and easily by simply pressing the guide plate against the frame while inserting the protrusions of the frame into the elongated hole.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, various embodiments of the present invention will be explained with reference to the accompanying drawings. Among the drawings, constituents identical to each other will be referred to with characters identical to each other without their explanations being repeated.

Figure 1:
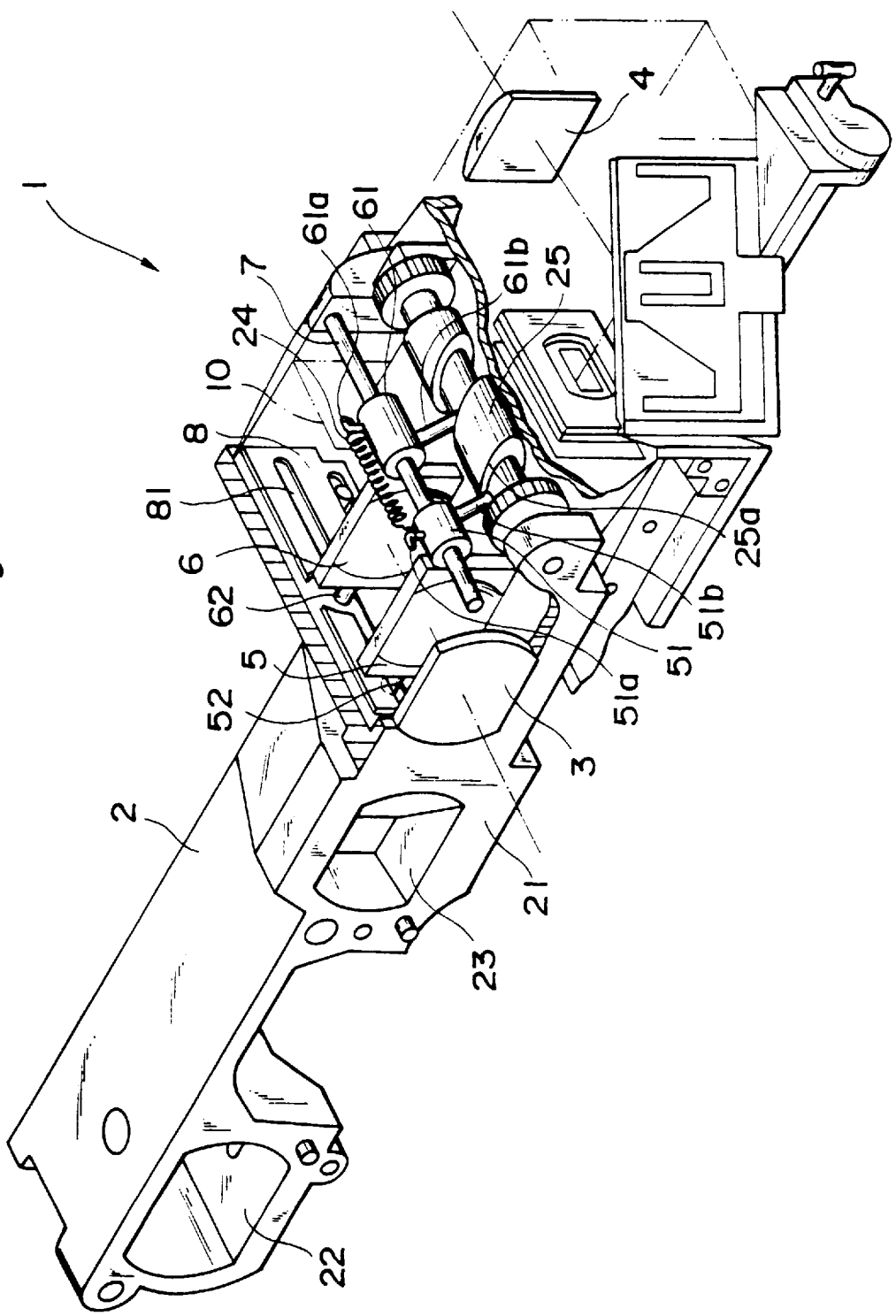
FIG. 1 is a perspective view showing a finder in accordance with an embodiment of the present invention.

FIG. 1 is a perspective view showing a finder in accordance with an embodiment of the present invention. In FIG. 1, a finder 1 is equipped with a main body 2 which is a frame for mounting parts. Attached to this main body 2 are constituents such as an AF section (autofocus section) and a lens section. Formed in the main body 2 at its front face 21 are an accommodating cavity 22 for a light receiving section used for autofocus and an accommodating cavity 23 for a light projecting section, thus allowing a light receiving element, a light emitting element, and the like to be received therein. Also attached to the front face 21 of the main body 2 is an objective lens 3 which is a constituent of a finder optical system and forms a part of fixed lenses. Attached to the back side of the main body 2 is an eyepiece 4 which is a constituent of the finder optical system and forms a part of fixed lenses.

As shown in FIG. 1, a first movable lens 5 and a second movable lens 6 are disposed on an optical axis 10 connecting the objective lens 3 and the eyepiece 4 together. The first and second movable lenses 5 and 6, which are used for enlarging and reducing an object image viewed through the eyepiece 4, are disposed so as to be movable along the optical axis 10.

A shaft 7 penetrates through one side edge portion (the right side portion as viewed from the objective lens 3 in FIG. 1) of each of the first and second movable lenses 5 and 6. The shaft 7, which is a guide member for guiding the movable lenses 5 and 6 as they move, is placed in parallel with the optical axis 10 and is attached to the main body 2, for example, with both ends secured thereto. The shaft 7 also penetrates through cylindrical members 51 and 61 respectively attached to the first and second movable lenses 5 and 6 at the one side edge portion.

A coil spring 24 is held between hooks 51a and 61a which respectively project from the outer peripheries of the cylindrical members 51 and 61. Consequently, due to a tensile force of the coil spring 24 exerted through the hooks 51a and 61a, the first and second movable lenses 5 and 6 are urged so as to approach each other. Also, driven pins 51b and 61b respectively project from the outer peripheries of the cylindrical members 51 and 61 so as to abut to a cam groove 25a of a cylindrical cam 25 which is disposed in parallel with the shaft 7. Accordingly, as the cylindrical cam 25 rotates, the abutting positions of the movable pins 51b and 61b with respect to the cam groove 25a shift, whereby the movable lenses 5 and 6 appropriately move along the shaft 7. Without being restricted to such cylindrical cam 25, other means may also be used for moving the movable lenses 5 and 6 in the finder 1.

Also, as shown in FIG. 1, a guide plate 8 for preventing the movable lenses 5 and 6 from fluctuating is disposed within the main body 2. The guide plate 8 is attached to the inside of the main body 2 and has a slit 81, disposed in parallel with the optical axis 10, penetrating therethrough and functioning as a linear cam. The slit 81 forms an opening extending along the optical axis 10, into which protrusions 52 and 62 respectively projecting from the movable lenses 5 and 6 at their other side edge portion (the left side portion as viewed from the objective lens 3 in FIG. 1) are inserted, whereby the slit 81 engages with the side edge portion of each of the movable lenses 5 and 6. Due to this engagement, the movable lenses 5 and 6 smoothly slide along the longitudinal direction of the opening of the slit 81. As the guide plate 8, a thin plate made of a metal or the like is used, and the slit 81 is formed therein by press machining or the like. Consequently, the width of the slit 81 can attain a dimension more accurate than that obtained when the guide plate 8 is formed by molding a resin. Also, as the guide plate 8 is provided, the form of the main body 2 can be simplified, thus facilitating the making of the main body 2.

Figure 2:
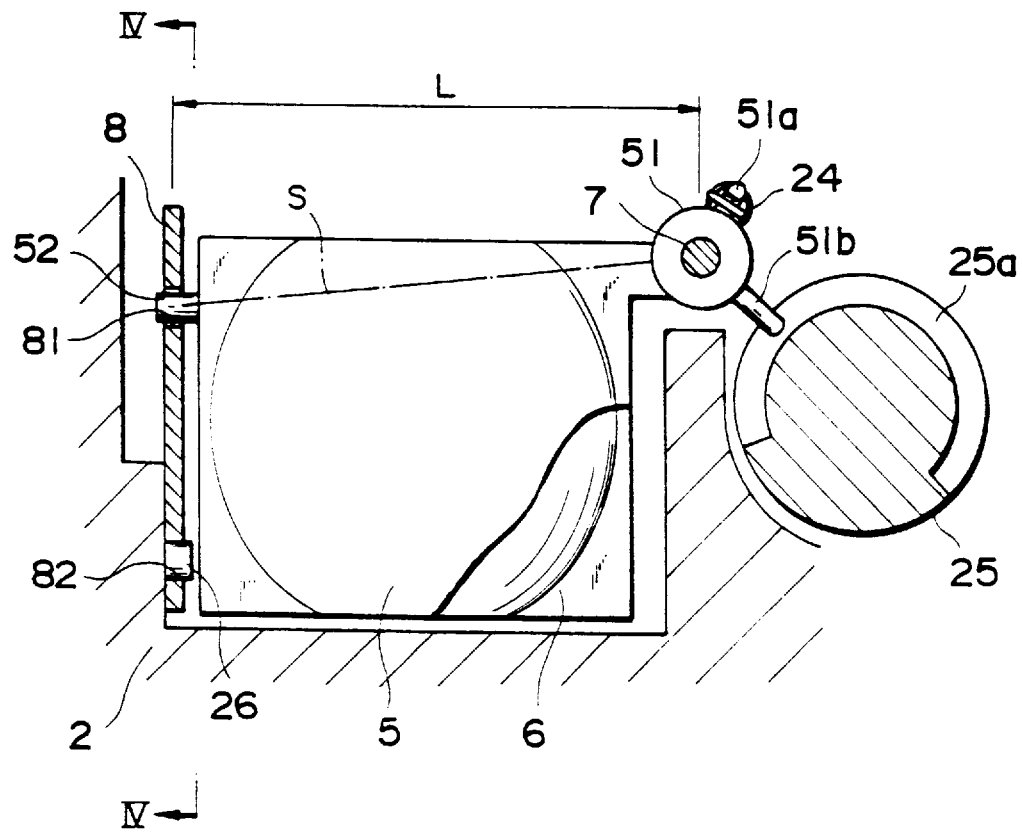
FIG. 2 is a view for explaining a movable lens.

FIG. 2 is a front view showing the movable lenses 5 and 6. As shown in FIG. 2, the shaft 7 and the guide plate 8 are respectively disposed at both sides of each of the movable lenses 5 and 6. The shaft 7 restrains the movable lenses 5 and 6 from fluctuating along the optical axis, whereas the guide plate 8 restrains the movable lenses 5 and 6 from fluctuating in the circumferential direction about the shaft 7, i.e., direction orthogonal to the optical axis. Therefore, in order for the guide plate 8 to suppress the fluctuation, it is preferred that the shaft 7 and the slit 81 be disposed with a long distance L therebetween. For example, in the case where the slit 81 and the protrusion 52 engage with each other with a considerable play therebetween, the deviation of the movable lens 5 from the optical axis can be reduced when the distance L between the shaft 7 and the slit 81 is made long.

When the shaft 7 and the slit 81 are respectively placed on both sides of each of the movable lenses 5 and 6 so as to support the movable lenses 5 and 6 in balance, the movable lenses 5 and 6 can be moved stably. For example, if the shaft 7 is disposed as it is (at the position shown in FIG. 2), while the guide plate 8 is disposed on the front face side or bottom face side of the movable lenses 5 and 6, almost all the weight of each of the movable lenses 5 and 6 will be exerted on the slit 81. On the other hand, the moving force will be applied to only the cylindrical members 51 and 61, thus yielding a low efficiency of transmitting the moving force in the movable lenses 5 and 6, whereby the movable lenses 5 and 6 cannot be moved smoothly.

Figure 3:
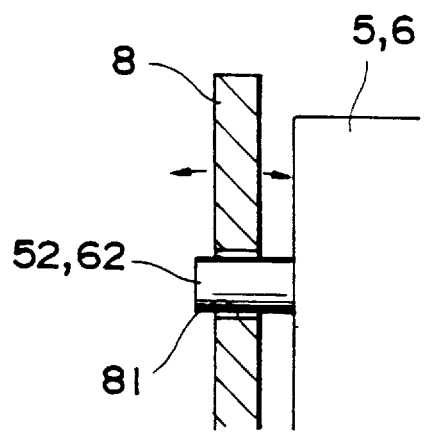
FIG. 3 is a view for explaining a state where the movable lens is supported.

Also, as shown in FIG. 2, the protrusion 52 of the movable lens 5 projects substantially in parallel with a line S connecting the shaft 7 and the slit 81 together and is inserted into the slit 81. Consequently, even when the guide plate 8 moves toward or away from the movable lenses 5 and 6 as shown in FIG. 3, it does not affect the engagement of the protrusions 52 and 62 of the movable lenses 5 and 6 with the slit 81, and the movable lenses 5 and 6 can move smoothly. Accordingly, as long as the guide plate 8 can be restrained from moving up and down (in directions perpendicular to the slit 81), it can be attached to the main body 2 in a simple manner. Though the line S and the projecting direction of the protrusion 52 are not exactly in parallel with each other in FIG. 2, it is preferred that they be completely in parallel with each other in order to move the movable lenses 5 and 6 more smoothly.

Figure 4:
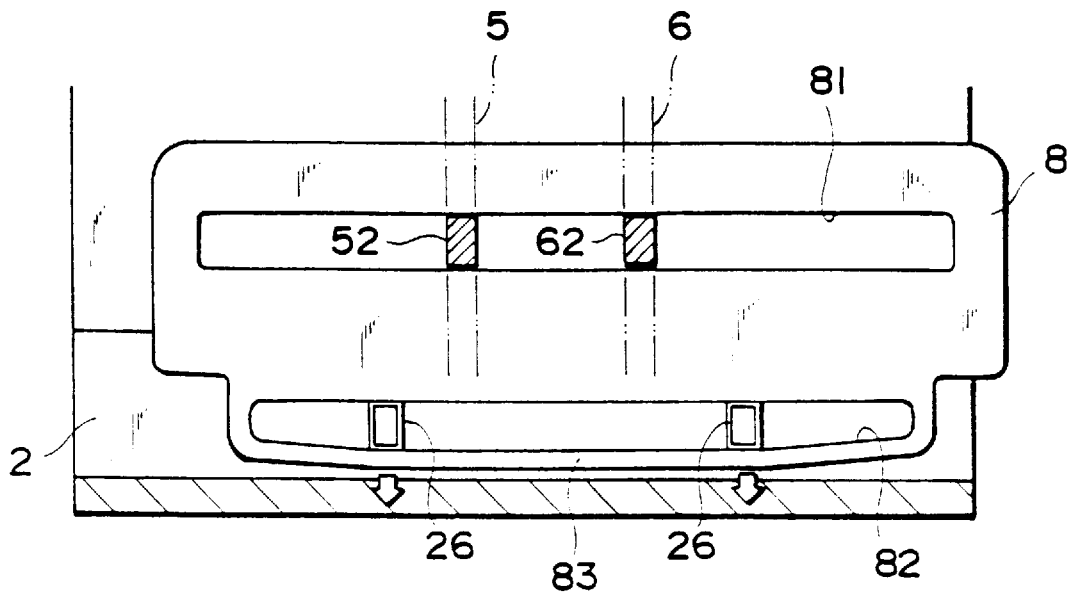
FIG. 4 is a cross-sectional view taken along line IV—IV of FIG. 2.
Figure 5:
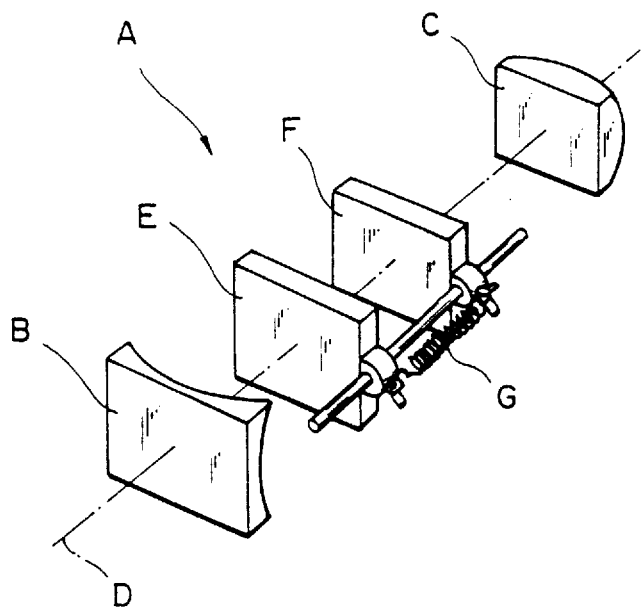
FIG. 5 is a schematic perspective view showing a conventional finder.

FIG. 4 is a view for explaining a structure for attaching the guide plate 8. In FIG. 4, the guide plate 8 is formed with an elongated hole 82 in the vicinity of its outer edge portion. The elongated hole 82 is used for attaching the guide plate 8 to the main body 2 and is open along the outer edge. On the other hand, a plurality of protrusions 26 project from a side wall of the main body 2. As these protrusions 26 are pressed into the elongated hole 82, the guide plate 8 is secured to the main body 2. The width of each protrusion 26 is slightly larger than the opening width of the elongated hole 82 such that the protrusion 26 can be inserted into the elongated hole without being easily dropped therefrom. In order for the protrusion 26 to be easily inserted into the elongated hole 82, it is preferred that the protrusion 26 be tapered by chamfering the corner portions between the tip surface and side surfaces of the protrusion 26, for example.

The position in the vicinity of the outer edge portion concerning the opening of the elongated hole 82 refers to a position at which, when the protrusions 26 are pressed into the elongated hole 82, the elongated hole 82 approaches the outer edge of the guide plate 8 to such an extent that a thin portion 83 between the elongated hole 82 and the outer edge of the guide plate 8 elastically deforms. As the elongated hole 82 is opened at such a position, the protrusions 26 can be inserted into the elongated hole 82 by elastically deforming the thin portion 83 alone. Consequently, when the protrusions 26 are pressed in, the deformation of the guide plate 8 is prevented from extending to the slit 81, whereby the opening width of the slit 81 would not be narrowed. Accordingly, the slit 81 can securely engage with the movable lenses 5 and 6. Thus, when the protrusions 26 are pressed into the elongated hole 82, the guide plate 8 can easily be attached to the main body 2, and the slit 81 can securely engage with the movable lenses 5 and 6 thereafter.

Preferably, the surface of the guide plate 8 is plated for lubrication. In this case, sliding resistance between the slit 81 and the protrusions 52 and 62 can be reduced, thus allowing the movable lenses 5 and 6 to move more smoothly. It is also preferred that the surface of the guide plate 8 facing the movable lenses 5 and 6 be provided with hairlines. Namely, when the surface of the guide plate 8 facing the movable lenses 5 and 6 is formed with hairlines each extending in a direction orthogonal to the movement of the movable lenses 5 and 6, flare can be prevented from occurring within the finder 1. Further, when the lubricative plating and the hairline processing are used together, the flare prevention can be realized more effectively.

In the following, operations of the finder 1 will be explained.

In FIG. 1, at the time of photographing by the camera, when the photographing mode is switched from wide angle to telephoto, the lens mount extends from the front face of the camera and, at the same time, the cylindrical cam 25 in the finder 1 starts rotating. Then, according to the shape of the cam groove 25a of the cylindrical cam 25, the movable lenses 5 and 6 begin to move toward the front face of the camera.

Here, since the right and left side edges of each of the movable lenses 5 and 6 are respectively supported by the shaft 7 and the guide 8 so as to keep a balance, the movable lenses 5 and 6 smoothly move in a stable state. Also, since the guide plate 8 is separated from the main body 2 so that the accuracy in opening dimensions of the slit 81 engaging with the movable lenses 5 and 6 is improved, the movable lenses 5 and 6 are prevented from fluctuating in directions orthogonal to the optical axis. Further, though the guide plate 8 is separated from the main body 2, it does not shift in the circumferential direction about the shaft 7, whereby the engaging positions of the movable lenses 5 and 6 do not move up and down.

As the movable lenses 5 and 6 are moved, the object image or the like viewed through the eyepiece 4 is enlarged without generating image blur, whereby the range of field of view of the finder 1 can be changed in conformity to a photographing range without imparting any sense of discomfort to a photographer.

In accordance with such finder 1, as the side edge portions of each of the movable lenses 5 and 6 are supported by the shaft 7 and the guide plate 8, the movable lenses 5 and 6 can be moved along the optical axis accurately and securely, while the structure for supporting the movable lenses 5 and 6 is simplified. Accordingly, when a high-performance lens is used in the optical system of the finder 1, performances of the lens can fully be exhibited without emphasizing the image blur, thus allowing a vivid object image to be observed.

As explained in the foregoing, the following effects can be obtained in accordance with the present invention.

Since a shaft is disposed in parallel with the optical axis so as to penetrate through one edge portion of a movable lens, and a guide plate having a slit extending in parallel with the optical axis is provided for preventing the movable lens from fluctuating in directions orthogonal to the optical axis as the side edge portion of the movable lens is slidably engaged with the slit, the movable lens is supported at the right and left side edge portions thereof so as to keep a balance, whereby the movable lens can be moved accurately and smoothly. As a result, image blur is prevented from occurring in the object image or the like. Also, by use of a high-performance lens, a vivid object image can be observed.

Also, the guide plate is attached to the frame as a plurality of protrusions projecting from the frame are pressed into an elongated hole of the guide plate, attaching the guide plate can be facilitated, thus allowing the finder to be produced efficiently. Also, at the time when the guide plate is being attached, the slit of the guide plate is prevented from deforming, thus failing to affect the accurate and smooth movement of the movable lens.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A finder comprising:
   a frame;
   a fixed lens attached to said frame;
   a first movable lens movable along an optical axis of said fixed lens and having first and second opposite side edge portions;
   a shaft disposed in said frame in parallel with said optical axis so as to penetrate through said first side edge portion of said first movable lens; and
   a guide plate, having a slit extending in parallel with said optical axis, for preventing said first movable lens from fluctuating in a direction orthogonal to said optical axis, said second side edge portion of said first movable lens slidingly engaging with said slit, said guide plate being provided with an elongated hole and an elastically deformable portion disposed in the vicinity of an outer edge thereof, said guide plate being attached to said frame by pressing into said elongated hole a plurality of protrusions projecting from said frame.

2. A finder according to claim 1, wherein a cylindrical member is attached to said first side edge portion of said first movable lens, said shaft penetrating through said cylindrical member.

3. A finder according to claim 2, wherein a driven pin projects from an outer periphery of said cylindrical member, said driven pin engaging a cam groove formed in a cylindrical cam disposed in parallel with said shaft.

4. A finder according to claim 1, wherein said fixed lens comprises an objective lens.

5. A finder according to claim 1, including a second movable lens spaced from said first movable lens and movable along the optical axis of said fixed lens.

6. A finder according to claim 5, wherein said second movable lens includes a first side edge portion penetrated by said shaft and a second side edge portion opposite its first side edge portion slidably engaging with said slit.

7. A finder according to claim 1, wherein said fixed lens comprises an eyepiece.

8. A finder according to claim 1, wherein said first movable lens includes a protrusion on its second side edge portion projecting into said slit substantially parallel to a line connecting said shaft and said slit.

* * * * *